United States Patent
Yonezawa

(10) Patent No.: US 6,325,340 B1
(45) Date of Patent: Dec. 4, 2001

(54) SPACER AND MOUNTING STRUCTURE FOR LEAD WIRE EMPLOYING THE SAME

(75) Inventor: Hideo Yonezawa, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/501,817

(22) Filed: Feb. 10, 2000

(30) Foreign Application Priority Data

Jan. 17, 2000 (JP) .................................................. 12-000118

(51) Int. Cl.⁷ ...................................................... F16L 3/08
(52) U.S. Cl. ......................... 248/74.1; 174/138 G; 174/196
(58) Field of Search ....................... 248/71, 74.1, 68.1, 248/69, 74.3, 231.21; 174/154–157, 164, 167, 196, 168, 169, 170, 138 F, 138 G; 403/187

(56) References Cited

U.S. PATENT DOCUMENTS

| | | | |
|---|---|---|---|
| 1,972,614 | * 9/1934 | Austin | 174/196 |
| 1,992,284 | * 2/1935 | Banks | 174/155 |
| 2,688,655 | * 9/1954 | Gross | 174/164 |
| 2,817,700 | * 12/1957 | Boerlin | 174/154 |
| 2,831,915 | * 4/1958 | Prowant | 174/158 F |
| 2,931,853 | * 4/1960 | Wilson | 174/170 |
| 3,272,913 | * 9/1966 | Crimmins et al. | 174/138 F |
| 4,011,397 | * 3/1977 | Bouche | 248/74.1 |
| 5,021,612 | * 6/1991 | Joffe | 174/146 |
| 6,072,125 | * 6/2000 | Takeuchi | 174/92 |

FOREIGN PATENT DOCUMENTS

| | | |
|---|---|---|
| 59-32158 | 1/1979 | (JP) . |
| 60-61780 | 9/1983 | (JP) . |
| 4-34783 | 3/1992 | (JP) . |
| 3059994 | 12/1998 | (JP) . |

* cited by examiner

Primary Examiner—Ramon O. Ramirez
Assistant Examiner—Tan Le
(74) Attorney, Agent, or Firm—Lackenbach Siegel Marzullo Aronson & Greenspan, P.C.

(57) ABSTRACT

A space capable of readily mounting wires having different diameters and reliably preventing displacement of the wires with a simple structure is provided. This spacer is provided with a mounting hole capable of mounting wires having different diameters, and a hook and a hook receiver are provided on opposite end surfaces of a substantially V-shaped release portion. Any wire is fixed by simply inserting the wire into the release portion for mounting the same on the mounting hole and thereafter hanging the hook on the hook receiver. Thus, wires having different diameters can be readily mounted and reliably prevented from displacement with a simple structure. The wires can be readily mounted and dismounted by the hook and the hook receiver.

14 Claims, 8 Drawing Sheets

SPACER AND MOUNTING STRUCTURE FOR LEAD WIRE EMPLOYING THE SAME

BACKGROUND OF THE INVENTION

1. Field of the Invention

The present invention relates to a spacer and a mounting structure for a lead wire employing the same, and more particularly, it relates to a spacer capable of mounting wires having different diameters and a mounting structure for a lead wire employing the same.

2. Description of the Prior Art

In general, a spacer for mounting a lead wire such as an anode lead wire delivered from a CRT or the like is known in the art. This spacer has a function of preventing the lead wire from coming into contact with the CRT or the like.

A spacer capable of mounting lead wires having different diameters is developed as such a conventional spacer. For example, Japanese Utility Model Laying-Open No. 4-34783 (1992) discloses such a spacer. FIG. 11 is a perspective view showing the conventional spacer disclosed in Japanese Utility Model Laying-Open No. 4-34783. Referring to FIG. 11, the conventional spacer is provided with two through holes 110 and 111, to be capable of corresponding to lead wires having different diameters.

However, the conventional spacer is not so fixed as to completely close a lead wire inlet 108, and hence a lead wire 109 may be displaced from the spacer.

Japanese Utility Model Laying-Open No. 60-61780 (1985), for example, proposes a structure for preventing displacement of a lead wire from a spacer capable of mounting lead wires having different diameters. In the proposed structure, the spacer is divided into two parts while a pair of serrate engaging portions are provided around a lead wire mounting portion formed on a central part. The divided parts of the spacer are engaged with each other through the pair of serrate engaging portions, thereby undisplaceably fixing a lead wire. In the proposed conventional spacer, however, the serrate engaging portions are complicated in structure and it is disadvantageously troublesome to dismount a lead wire once mounted.

SUMMARY OF THE INVENTION

An object of the present invention is to provide a spacer capable of mounting wires having different diameters and reliably preventing displacement of the wires with a simple structure.

Another object of the present invention is to readily mount and dismount the wires in the aforementioned spacer.

Still another object of the present invention is to provide a mounting structure for a lead wire capable of mounting wires having different diameters and reliably preventing displacement of the wires with a simple structure.

A Further object of the present invention is to readily mount and dismount the wires in the aforementioned mounting structure for a lead wire.

A spacer according to an aspect of the present invention comprises an outer frame, a plurality of ribs, a mounting portion, a release portion, a hook and a hook receiver. The plurality of ribs are radially provided from the outer frame toward a central part. The mounting portion is provided on the central part of the outer frame, and is capable of mounting wires having different diameters. The release portion is provided to reach the mounting portion the central part from the outer frame, and is substantially V-shaped. The hook is integrally provided on one of opposite end surfaces of the substantially V-shaped release portion. The hook receiver is integrally provided on another one of the opposite end surfaces of the substantially V-shaped release portion.

The spacer according to this aspect is provided with the mounting portion capable of mounting wires having different diameters as well as the hook and the hook receiver formed on the opposite end surfaces of the release portion as hereinabove described, for readily fixing wires having different diameters by simply inserting the wires having different diameters from the release portion for mounting the same on the mounting portion and thereafter hanging the hook on the hook receiver. Thus, a spacer capable of readily mounting wires having different diameters and reliably preventing displacement of the wires can be provided. The hook and the hook receiver are simply provided on the opposite end surfaces of the release portion, whereby the structure is simple. Further, the hook can be readily attached to/detached from the hook receiver, whereby the wires can be readily mounted and dismounted.

In the structure of the spacer according to the aforementioned aspect, the mounting portion may include a single mounting hole capable of mounting the wires having different diameters, and the single mounting hole may have three grip portions for holding the wires. At least one of the three grip portions is preferably elastically deformable in response to the diameter of the wire. Thus, at least one of the three grip portions is formed to be elastically deformable in response to the diameter of the wire, so that this grip portion is elastically deformed when mounting a wire having a thick diameter. Thus, not only a thin wire but also a thick wire can readily be fixed through the single mounting hole. Further, the wires having different diameters can be fixed at the same portion due to the single mounting hole, whereby the operator will not take a wrong mounting position dissimilarly to the case of a spacer having different mounting holes corresponding to wires having different diameters.

In the structure of the aforementioned spacer, the plurality of ribs may include a first rib, a second rib, a third rib and a fourth rib. In this case, the first and second ribs preferably form the substantially V-shaped release portion. The third rib preferably has a first branch portion branched into two parts on the central part, and one end of the first branch portion is preferably connected to an end of the first rib. The fourth rib preferably has a second branch portion branched into two on the central part, and one end of the second branch portion is preferably connected to an end of the second rib while another end of the second branch portion is preferably connected to another end of the first branch portion. The aforementioned grip portions may include a first grip portion, a second grip portion and a third grip portion. In this case, the first grip portion may be provided on the inner surface of a connecting portion between the third rib and the fourth rib. The second grip portion may be provided on the inner surface of a connecting portion between the third rib and the first rib. The third grip portion may be provided on the inner surface of a connecting portion between the fourth rib and the second rib. Preferably, the first grip portion, the second grip portion and the third grip portion are elastically deformable toward the outer frame. All of the first to third grip portions are formed to be elastically deformable toward the outer frame as described above, whereby the first to third grip portions are elastically deformed when mounting a wire having a large diameter. Thus, not only a thin wire but also a thick wire can be more readily fixed through the single mounting hole.

In the structure of the aforementioned spacer, a notch portion is preferably formed on a part of the outer frame opposite to the release portion, and end portions of the outer frame located on both ends of the notch portion can preferably be distorted and superposed with each other when opening the release portion for mounting the wires on the single mounting hole. The release portion can be more widely opened with the end portions of the outer frame located on both ends of the notch portion superposed with each other due to the aforementioned structure, whereby a thick wire can be readily inserted from the release portion.

In the structure of the aforementioned spacer, the single mounting hole may include a wire inlet on the side of the release portion. In this case, the width of the inlet of the single mounting hole preferably increases in response to the degree of opening of the release portion. When adjusting the degree of opening of the release portion in response to the diameter of the wire, the width of the inlet of the mounting hole increases due to the aforementioned structure, whereby the wire can be readily inserted into the mounting hole.

In the structure of the spacer according to the aforementioned aspect, the mounting hole may include a first mounting hole and a second mounting hole. In this case, the first mounting hole is preferably capable of mounting a wire having a first diameter. The second mounting hole is preferably provided adjacently to the first mounting hole, and capable of mounting a wire having a second diameter larger than the first diameter. Thus, two mounting holes capable of mounting wires having different diameters are so provided that the wires having different diameters can be readily mounted by combination of the two mounting holes, the hook and the hook receiver, and the wires can be reliably prevented from displacement with a simple structure. In this structure, further, a substantially V-shaped notch portion opening by absorbing stress applied to the spacer when hanging the hook on the hook receiver is preferably provided on the opposite side of the substantially V-shaped release portion. The spacer can be effectively prevented from application of stress due to the substantially V-shaped notch portion.

In the structure of the aforementioned spacer, the first mounting hole preferably includes a wire inlet on the side of the substantially V-shaped release portion, and the width of the inlet of the first mounting hole preferably increases in response to the degree of opening of the release portion. When adjusting the degree of opening of the release portion in response to the diameter of the wire, the width of the inlet of the first mounting hole increases due to the aforementioned structure, whereby the wire can be readily inserted into the first mounting hole.

A mounting structure for a lead wire employing a spacer according to another aspect of the present invention is a structure for mounting a lead wire with the spacer according to the aforementioned aspect. In this mounting structure for a lead wire, the lead wire is fixed by inserting the lead wire into the substantially V-shaped release portion for mounting the lead wire on the mounting portion and thereafter hanging the hook on the hook receiver. A mounting structure for a lead wire capable of readily mounting lead wires having different diameters and reliably preventing displacement of the lead wires can be provided due to the aforementioned structure. The hook and the hook receiver are simply provided on the opposite end surfaces of the release portion, whereby the structure is simple. Further, the hook can be readily attached to/detached from the hook receiver, whereby the lead wires can be readily mounted and dismounted.

In the mounting structure for a lead wire employing a spacer according to this aspect of the present invention, the lead wire may be a high-voltage lead wire employed for a cathode ray tube. When the lead wire is a high-voltage lead wire employed for a cathode ray tube, the spacer can sufficiently and reliably hold a space between the high-voltage lead wire and the cathode ray tube, whereby remarkably excellent safety can be attained.

In the mounting structure for a lead wire employing a spacer according to this aspect, the mounting portion may include a single mounting hole capable of mounting lead wires having different diameters, and the single mounting hole may have three grip portions for holding the lead wire. At least one of the three grip portions is preferably elastically deformable in response to the diameter of the lead wire. Thus, at least one of the three grip portions is formed to be elastically deformable in response to the diameter of the lead wire, so that this grip portion is elastically deformed when mounting a lead wire having a large diameter. Thus, not only a thin lead wire but also a thick lead wire can be readily fixed through the single mounting hole. Further, lead wires having different diameters can be mounted on the same portion by providing the single mounting hole, whereby the operator will not take a wrong mounting position dissimilarly to the case of a spacer having different mounting holes corresponding to lead wires having different diameters.

In the aforementioned mounting structure for a lead wire employing a spacer, the plurality of ribs may include a first rib, a second rib, a third rib and a fourth rib. In this case, the first and second ribs preferably form the substantially V-shaped release portion. The third rib preferably has a first branch portion branched into two parts on the central part, and one end of the first branch portion is preferably connected to an end of the first rib. The fourth rib preferably has a second branch portion branched into two parts on the central part and one end of the second branch portion is preferably connected to an end of the second rib while another end of the second branch portion is preferably connected another end of the first branch portion. The aforementioned grip portions may include a first grip portion, a second grip portion and a third grip portion. In this case, the first grip portion may be provided on the inner surface of a connecting portion between the third rib and the fourth rib. The second grip portion may be provided on the inner surface of a connecting portion between the third rib and the first rib. The third grip portion may be provided on the inner surface of a connecting portion between the fourth rib and the second rib. Preferably, the first grip portion, the second grip portion and the third grip portion are elastically deformable toward the outer frame. All of the first to third grip portions are formed to be elastically deformable toward the outer frame as described above, whereby the first to third grip portions are elastically deformed when mounting a lead wire having a large diameter. Thus, not only a thin lead wire but also a thick lead wire can be more readily fixed through the single mounting hole.

In the aforementioned mounting structure for a lead wire employing a spacer, a notch portion is preferably formed on a part of the outer frame opposite to the release portion, and end portions of the outer frame located on both ends of the notch portion can preferably be distorted and superposed with each other when opening the release portion for mounting the lead wire on the single mounting hole. The release portion can be more widely opened with the end portions of the outer frame located on both ends of the notch portion superposed with each other due to the aforementioned structure, whereby a thick lead wire can be readily inserted from the release portion.

In the aforementioned mounting structure for a lead wire employing a spacer, the single mounting hole may include a wire inlet on the side of the release portion. In this case, the width of the inlet of the single mounting hole preferably increases in response to the degree of opening of the release portion. When adjusting the degree of opening of the release portion in response to the diameter of the lead wire, the width of the inlet of the mounting hole increases due to the aforementioned structure, whereby the lead wire can be readily inserted into the mounting hole.

In the mounting structure for a lead wire employing a spacer according to this aspect, the mounting hole may include a first mounting hole and a second mounting hole. In this case, the first mounting hole is preferably capable of mounting a lead wire having a first diameter. The second mounting hole is preferably provided adjacently to the first mounting hole, and capable of mounting a lead wire having a second diameter larger than the first diameter. Thus, two mounting holes capable of mounting lead wires having different diameters are so provided that the lead wires having different diameters can be readily mounted by combination of the two mounting holes, the hook and the hook receiver, and the lead wires can be reliably prevented from displacement with a simple structure. In this structure, further, a substantially V-shaped notch portion opening by absorbing stress applied to the spacer when hanging the hook on the hook receiver is preferably provided on the opposite side of the substantially V-shaped release portion. The spacer can be effectively prevented from application of stress due the substantially V-shaped notch portion.

In the aforementioned mounting structure for a lead wire employing a spacer, the first mounting hole preferably includes a wire inlet on the side of the substantially V-shaped release portion, and the width of the inlet of the first mounting hole preferably increases in response to the degree of opening of the release portion. When adjusting the degree of opening of the release portion in response to the diameter of the lead wire, the width of the inlet of the first mounting hole increases due to the aforementioned structure, whereby the lead wire can be readily inserted into the first mounting hole.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

(First Embodiment)

Figure 1:
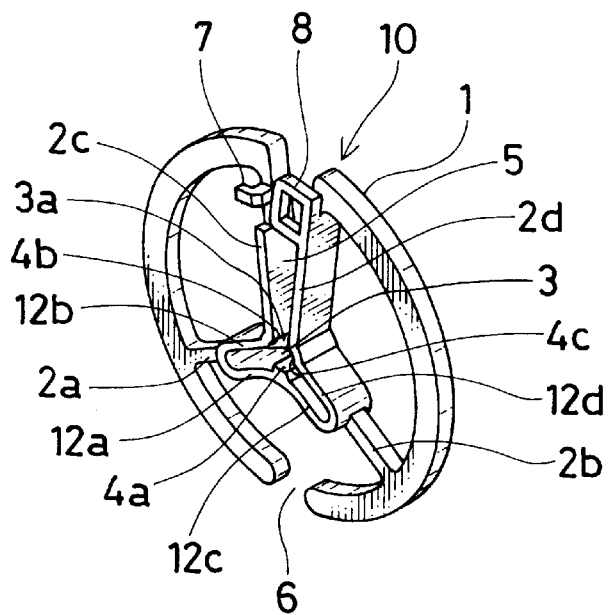
FIG. 1 is a schematic diagram showing a spacer according to a first embodiment of the present invention.
Figure 2:
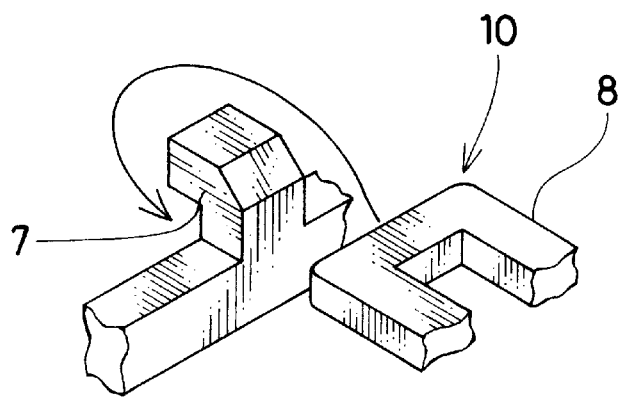
FIG. 2 is an enlarged perspective view of a hook portion of the spacer shown in FIG. 1.

Referring to FIGS. 1 and 2, a spacer 10 according to a first embodiment of the present invention has four ribs 2a, 2b, 2c and 2d radially provided from an outer frame 1 toward a central part. The ribs 2c and 2d form the first and second ribs of the present invention respectively. The ribs 2a and 2b form the third and fourth ribs of the present invention respectively.

The ribs 2c and 2d form a substantially V-shaped release portion 5. The rib 2a has two branch portions (first branch portions) 12a and 12b, and the rib 2b has two branch portions (second branch portions) 12c and 12d. The branch portion 12a of the rib 2a is connected with the branch portion 12c of the rib 2b. The branch portion 12b of the rib 2a is connected with the rib 2c. The branch portion 12d of the rib 2b is connected with the rib 2d.

A grip portion (first grip portion) 4a is formed on the inner side of a connecting portion between the branch portions 12a and 12c. A grip portion (second grip portion) 4b is formed on the inner side of a connecting portion between the branch portion 12b and the rib 2c. A grip portion (third grip portion) 4c is formed on the inner side of a connecting portion between the branch portion 12d and the rib 2d. The three grip portions 4a, 4b and 4c are flexibly deformable (elastically deformable) toward the outer frame 1. Lead wires having different diameters can be gripped with the three grip portions 4a, 4b and 4c. A mounting hole 3 is provided to be enclosed with the three grip portions 4a, 4b and 4c. The mounting hole 3 is provided with a lead wire inlet 3a on the side of the release portion 5.

According to the first embodiment, a hook 7 is integrally provided on the rib 2c forming the release portion 5, as shown in FIGS. 1 and 2. A hook receiver 8 engageable with the hook 7 is integrally provided on the other rib 2d forming the release portion 5. A notch portion 6 is formed on the opposite side of the release portion 5.

Figure 3:
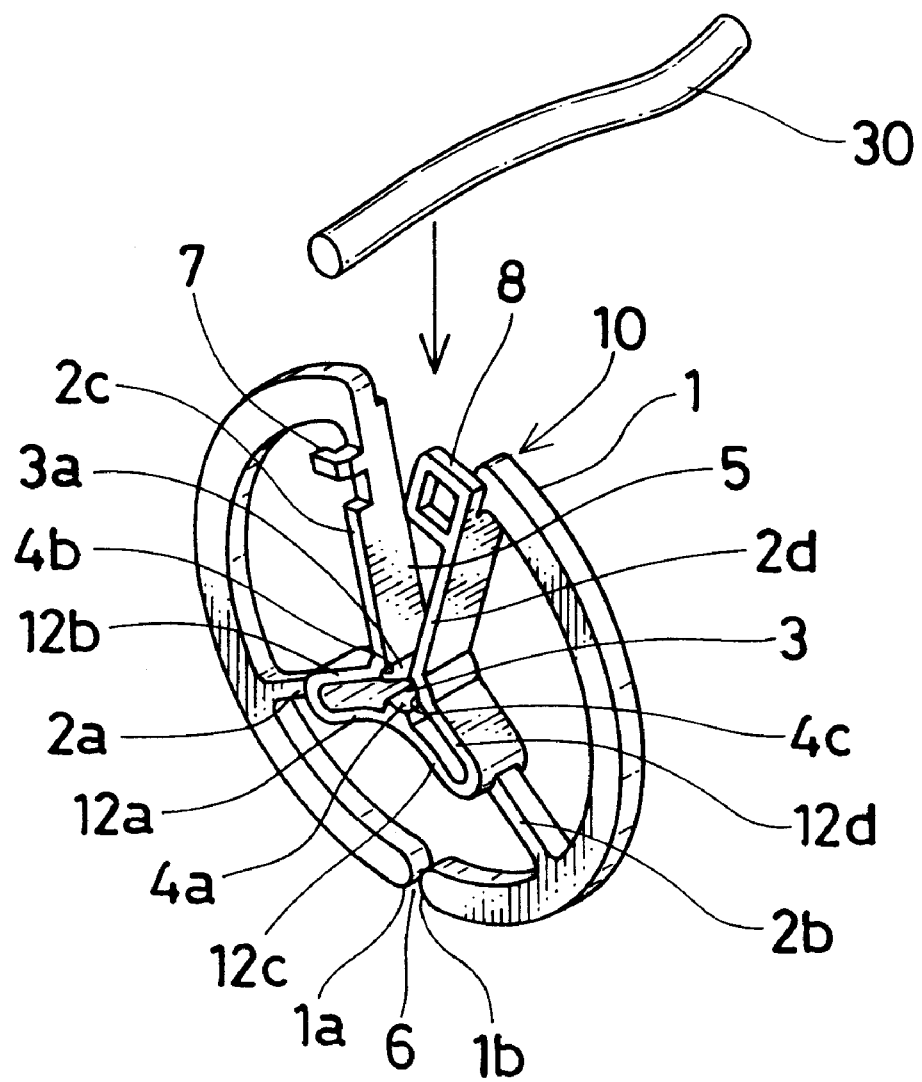
FIGS. 3 and 4 are schematic diagrams for illustrating a procedure for mounting a thin lead wire on the spacer.

A procedure for mounting a thin lead wire 30 on the spacer 10 according to the first embodiment is now described with reference to FIGS. 3 and 4. As shown in FIG. 3, the V-shaped release portion 5 is first spread thereby increasing the width of the lead wire inlet 3a. In this case, the width of the lead wire inlet 3a increases in response to the degree of opening of the release portion 5. When adjusting the degree of opening of the release portion 5 in response to the diameter of the thin lead wire 30, therefore, the width of the lead wire inlet 3a of the mounting hole 3 increases so that the thin lead wire 30 can be readily inserted into the mounting hole 3 through the release portion 5 and the lead wire inlet 3a.

Figure 4:
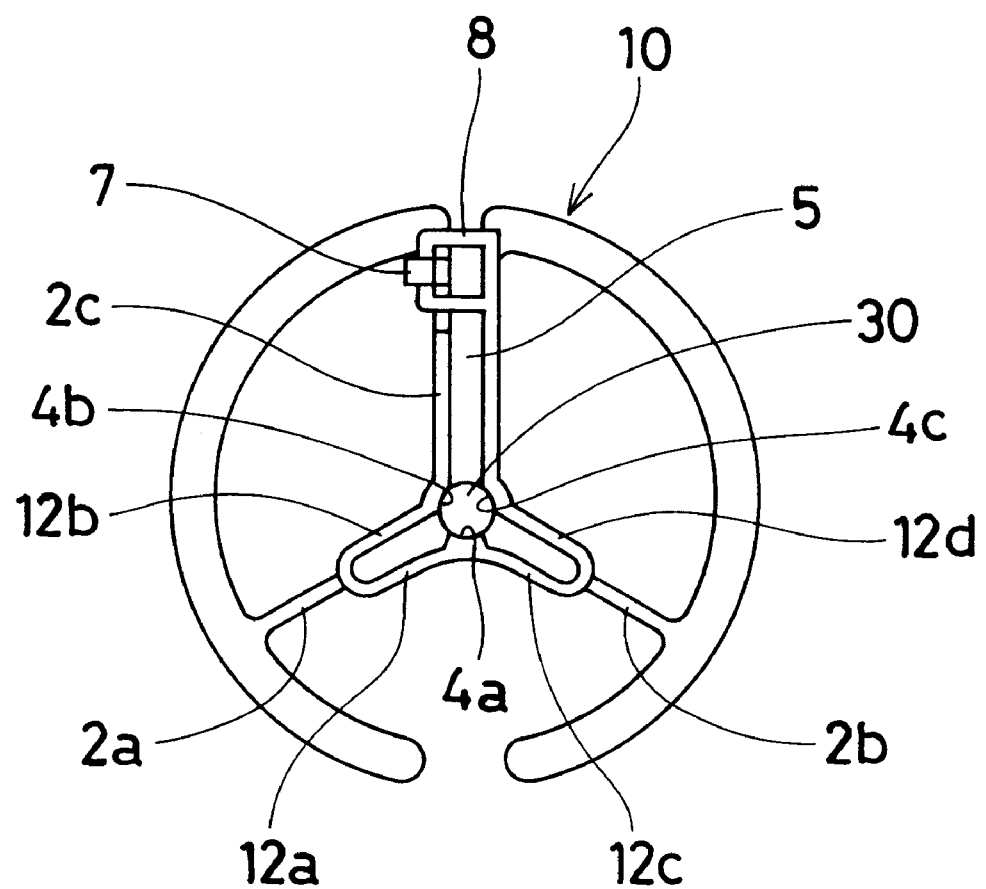

After inserting the thin lead wire 30 into the mounting hole 3, the hook 7 is hung on the hook receiver 8 thereby fixing the thin lead wire 30 by the grip portions 4a, 4b and 4c as shown in FIG. 4. The diameter 3 of the mounting hole 3 is set slightly smaller than that of the thin lead wire 30. Thus, the three grip portions 4a, 4b and 4c can grip the thin lead wire 30 with a certain degree of clamping force when mounting the thin lead wire 30 on the mounting hole 3. Consequently, the spacer 10 can be prevented from moving with respect to the thin lead wire 30.

Figure 5:
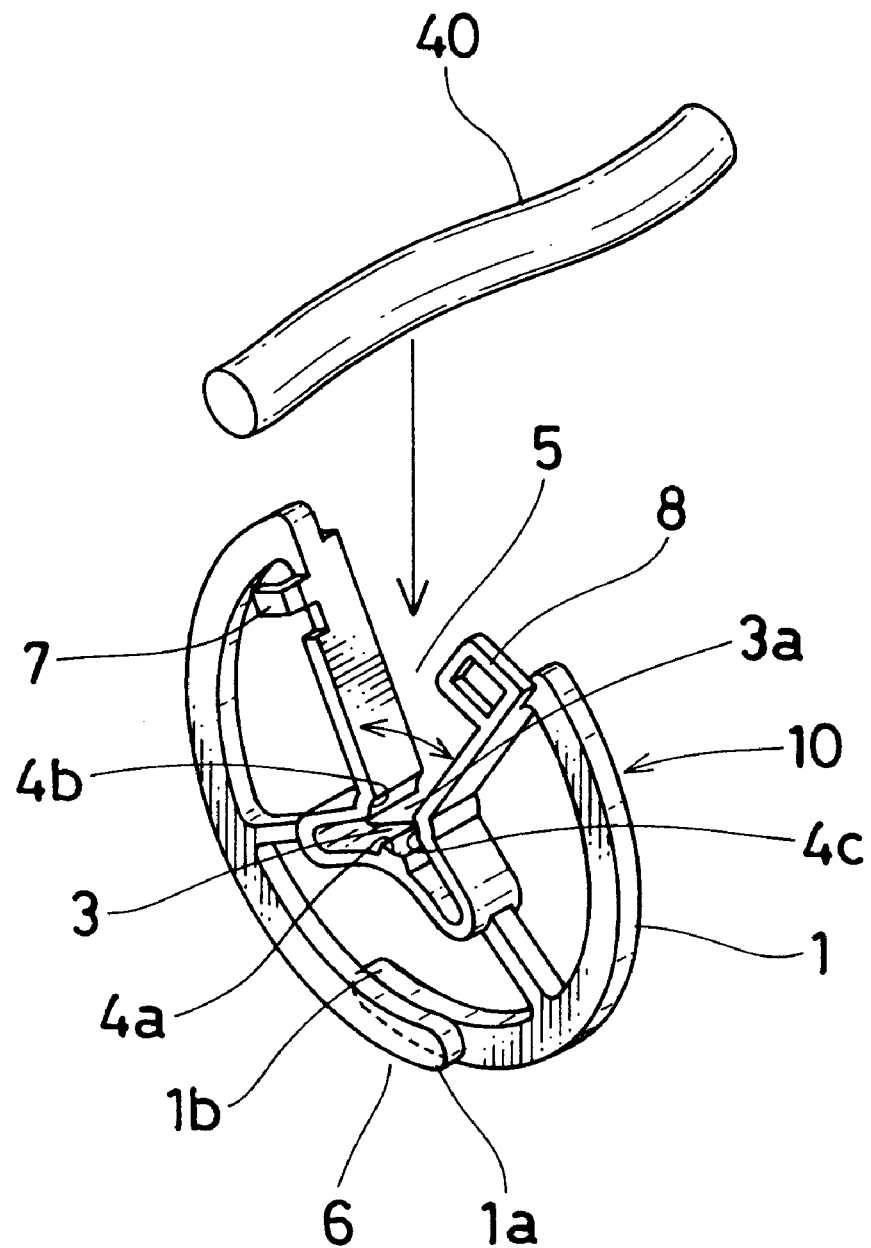
FIGS. 5 and 6 are schematic diagrams for illustrating a procedure for mounting a thick lead wire on the spacer.

A procedure of mounting a thick lead wire 40 on the spacer 10 according to the first embodiment is now described with reference to FIGS. 5 and 6. First, the V-shaped release portion 5 is relatively largely spread thereby largely increasing the width of the lead wire inlet 3a, as shown in FIG. 5. In this case, end portions 1a and 1b of the outer frame 1 closer to the notch portion 6 are distorted as shown in FIG. 5, to be superposable with each other. According to the first embodiment, the release portion 5 can be more largely spread due to such superposition of the end portions 1a and 1b, whereby the thick lead wire 40 can be readily inserted into the mounting hole 3 through the release portion 5 and the lead wire inlet 3a.

Figure 6:
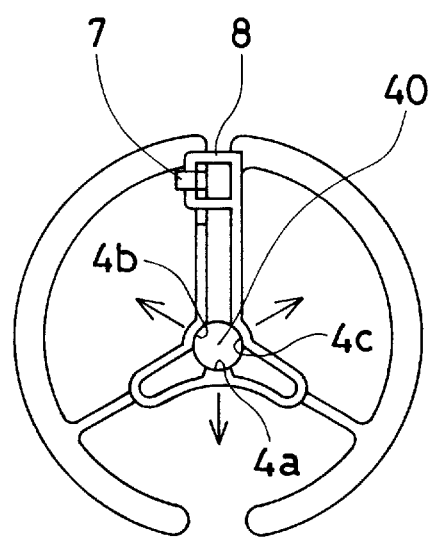

After inserting the thick lead wire 40 into the mounting hole 3, the hook 7 is hung on the hook receiver 8 thereby fixing the thick lead wire 40 with the grip portions 4a, 4b and 4c, as shown in FIG. 6. In this case, the grip portions 4a, 4b and 4c are flexibly deformable (elastically deformable) along arrows shown in FIG. 6, and hence the grip portions 4a, 4b and 4c are elastically deformed along arrows when mounting the thick lead wire 40.

According to the first embodiment, not only the aforementioned thin lead wire 30 but also the thick lead wire 40 can be readily fixed through the single mounting hole 30 by elastically deformably forming the grip portions 4a, 4b and 4c as described above. The elastically deformed three grip portions 4a, 4b and 4c relatively strongly clamp the thick lead wire 40 with elastic returning force, whereby the spacer 10 can be effectively prevented from moving with respect to the thick lead wire 40.

Figure 7:
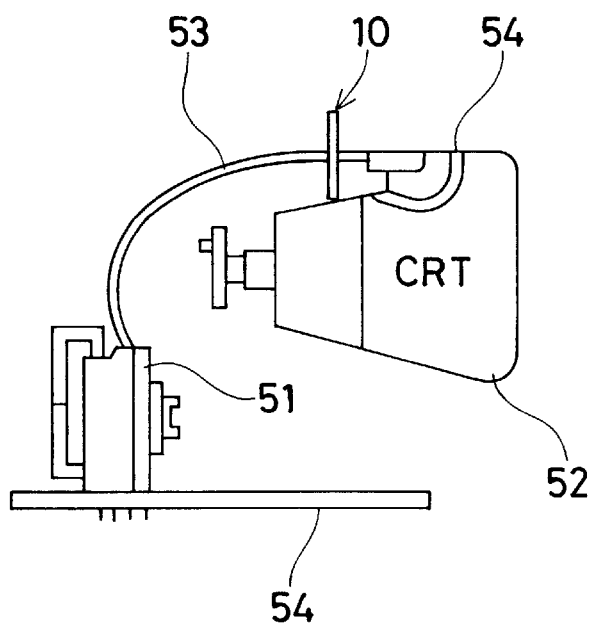
FIG. 7 is a schematic diagram showing the spacer according to the first embodiment mounted on an anode lead wire of a CRT.

FIG. 7 shows the spacer 10 according to the first embodiment mounted on an anode lead wire 53 of a CRT (cathode ray tube) 52 along the aforementioned procedure of mounting the spacer 10. Referring to FIG. 7, the high-voltage anode lead wire 53 delivered from an anode 54 of the CRT 52 is connected to a flyback transformer 51 provided on a printed board 54. The spacer 10 according to the first embodiment is mounted on the anode lead wire 53. Thus, the anode lead wire 53 can be reliably prevented from coming into contact with the CRT 52 or another electric part or the like.

The spacer 10 according to the first embodiment, which is provided with the mounting hole 3 capable of mounting lead wires having different diameters as well as the hook 7 and the hook receiver 8 on opposite end surfaces of the release portion 5, can fix any lead wire by simply inserting the lead wire from the release portion 5 for mounting the same on the mounting hole 3 and thereafter hanging the hook 7 on the hook receiver 8. Thus, the spacer 10 can readily mount lead wires having different diameters and reliably prevent displacement of the lead wires. The hook 7 and the hook receiver 8 are simply provided on the opposite end surfaces of the release portion 5, whereby the structure is simple. The hook 7 can be readily attached to/detached from the hook receiver 8, whereby the lead wires can be readily mounted and dismounted.

The spacer 10 according to the first embodiment, which is provided with the single mounting hole 3 capable of mounting lead wires having different diameters, can fix the lead wires on the same portion. Thus, the operator will not take a wrong mounting position dissimilarly to the case of a spacer having different mounting holes corresponding to wires having different diameters.

(Second Embodiment)

Figure 8:
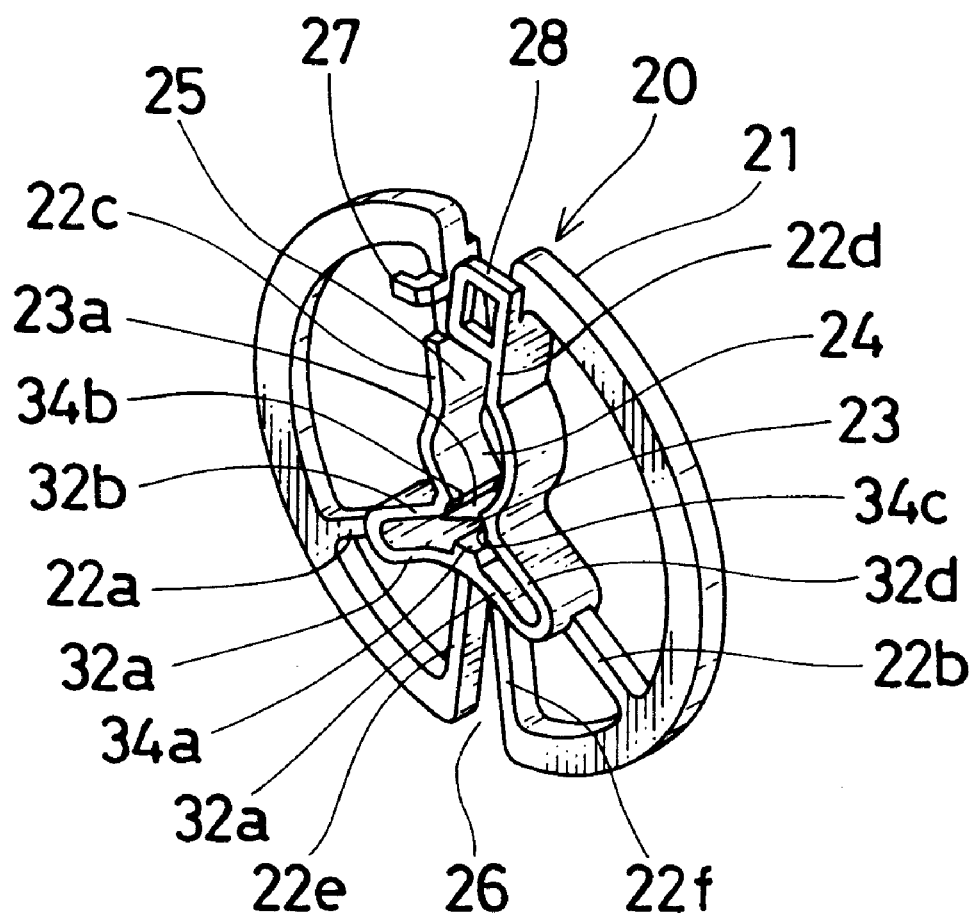
FIG. 8 is a schematic diagram showing a spacer according to a second embodiment of the present invention.
Figure 9:
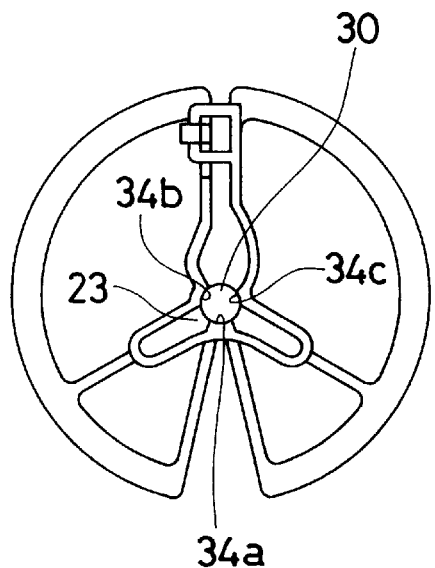
FIG. 9 is a schematic diagram showing the spacer according to the second embodiment on which a thin lead wire is mounted.
Figure 10:
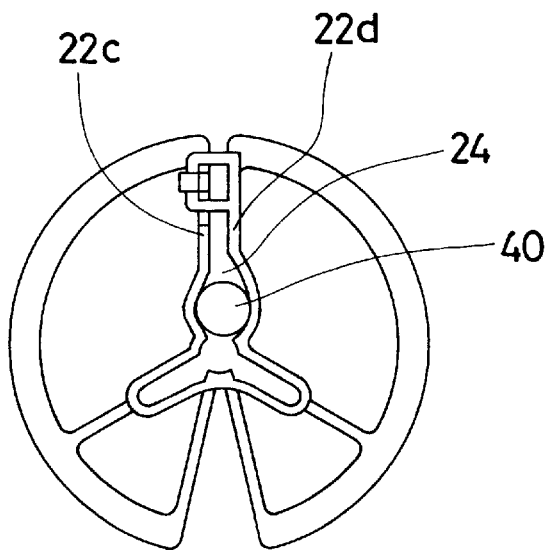
FIG. 10 is a schematic diagram showing the spacer according to the second embodiment on which a thick lead wire is mounted.
Figure 11:
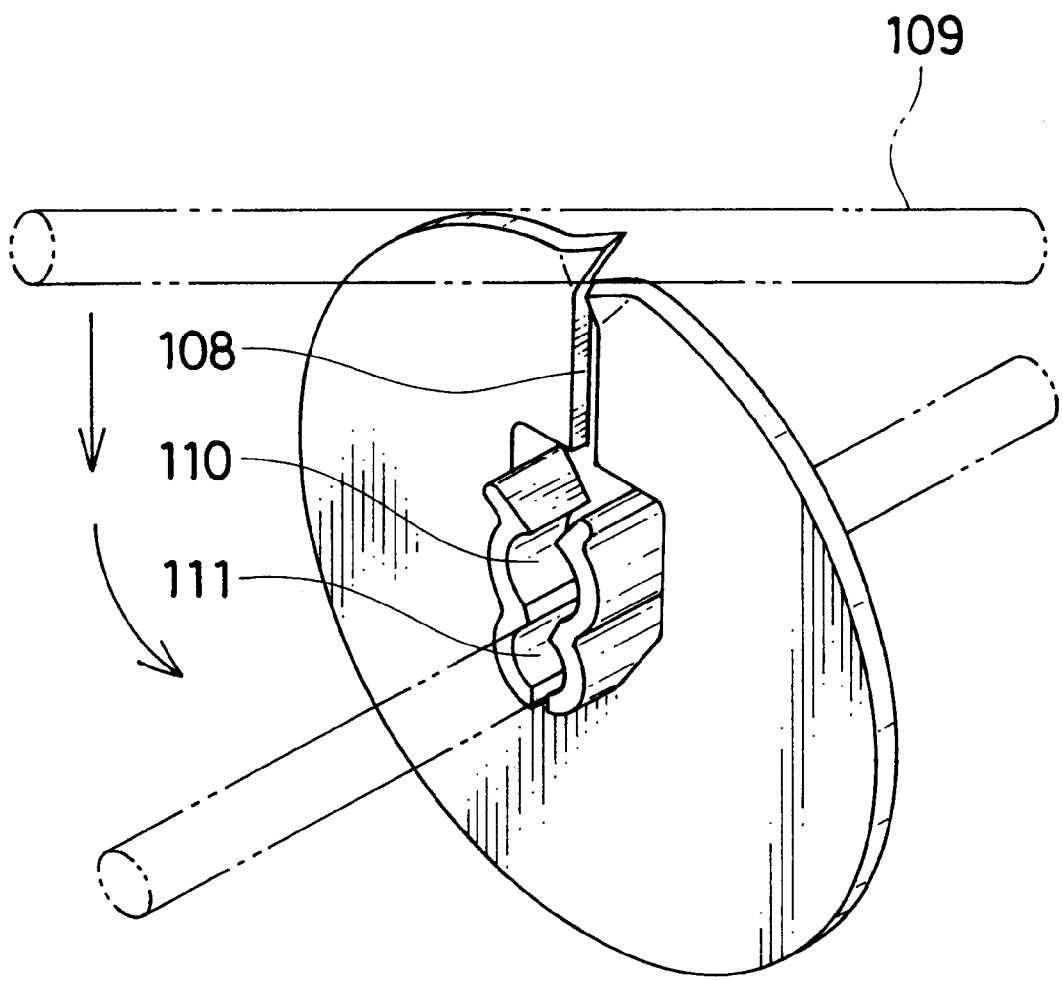
FIG. 11 is a perspective view showing a conventional spacer.

Referring to FIGS. 8 to 10, a spacer 20 according to a second embodiment of the present invention has two mounting holes, i.e., a first mounting hole 23 and a second mounting hole 24, dissimilarly to the aforementioned first embodiment. The first mounting hole 23 is provided on a central part. The second mounting hole 24 is provided on a position adjacent to the first mounting hole 23 by forming ribs 22c and 22d in outwardly projecting bent shapes. The first mounting hole 23 is employed for mounting a thin lead wire 30 (see FIG. 9), and the second mounting hole 24 is employed for mounting a thick lead wire 40 (see FIG. 10). According to the second embodiment, a substantially V-shaped notch portion 26 is provided on the opposite side of a release portion 25. This notch portion 26 is formed by two ribs 22e and 22f directed to the central part from an outer frame 21.

The remaining structure of the second embodiment is substantially identical to that of the first embodiment. Four ribs 22a, 22b, 22c and 22d are radially provided from the outer frame 21 toward the central part. The ribs 22c and 22d form the substantially V-shaped release portion 25. The rib 22a has two branch portions 32a and 32b, while the rib 22b has two branch portions 32c and 32d. The branch portion 32a of the rib 22a is connected with the branch portion 32c of the rub 22b. The branch portion 32b of the rib 22a is connected with the rib 22c. The branch portion 32d of the rib 22b is connected with the rib 22d.

A grip portion 34a is formed on the inner side of a connecting portion between the branch portions 32a and 32c. A grip portion 34b is formed on the inner side of a connecting portion between the branch portion 32b and the rib 22c. A grip portion 34c is formed on the inner side of a connecting portion between the branch portion 32d and the rib 22d. The three grip portions 34a, 34b and 34c grip the thin lead wire 30 in the first mounting hole 23. The first mounting hole 23 is provided with a lead wire inlet 23a on the side closer to the second mounting hole 24.

As shown in FIG. 8, the spacer 20 according to the second embodiment is provided with the first mounting hole 23 and the second mounting hole 24 capable of mounting lead wires having different diameters respectively. A hook 27 is integrally provided on the rib 22c forming the release portion 25, while a hook receiver 28 engageable with the hook 27 is integrally provided on the other rib 22d forming the release portion 25. Thus, the spacer 20 according to the second embodiment can readily mount lead wires having different diameters and reliably prevent displacement of the lead wires with a simple structure, similarly to the spacer 10 according to the first embodiment. Further, the spacer 20 can readily mount and dismount the lead wires.

Although the present invention has been described and illustrated in detail, it is clearly understood that the same is by way of illustration and example only and is not to be taken by way of limitation, the spirit and scope of the present invention being limited only by the terms of the appended claims.

For example, while all of the three grip portions 4a, 4b and 4c are formed to be flexibly deformable (elastically deformable) in the aforementioned first embodiment, the present invention is not restricted to this but lead wires having different diameters can be fixed through the single mounting hole 3 so far as at least one of the three grip portions 4a, 4b and 4c is flexibly deformable (elastically deformable).

Further, while the spacer 20 according to the second embodiment is provided with the two mounting holes, i.e., the first mounting hole 23 and the second mounting hole 24, the present invention is not restricted to this but three or more mounting holes may be provided.

What is claimed is:

1. A spacer comprising:

an outer frame;

a plurality of ribs radially provided from said outer frame toward a central part;

a mounting portion, provided on said central part of said outer frame, capable of mounting wires having different diameters;

a release portion, provided to reach said mounting portion on said central part from said outer frame, having a substantially V shape;

a hook integrally provided on one of opposite end surfaces of said substantially V-shaped release portion; and a hook receiver integrally provided on another one of said opposite end surfaces of said substantially V-shaped release portion, said mounting portion including a single mounting hole capable of mounting said wires having different diameters, and said single mounting hole having three grip portions for holding said wires, and at least one of said three grip portions is elastically deformable in response to the diameters of said wires.

2. The spacer according to claim 1, wherein said plurality of ribs include:
- first and second ribs forming said substantially V-shaped release portion,
- a third rib having a first branch portion branched into two parts on said central part with one end of said first branch portion connected to an end of said first rib, and
- a fourth rib having a second branch portion branched into two parts on said central part with one end of said second branch portion connected to an end of said second rib and another end of said second branch portion connected to another end of said first branch portion, said grip portions include:
- a first grip portion provided on the inner surface of a connecting portion between the third rib and said fourth rib,
- a second grip portion provided on the inner surface of a connecting portion between said third rib and said first rib, and
- a third grip portion provided on the inner surface of a connecting portion between said fourth rib and said second rib, and
- said first grip portion, said second grip portion and said third grip portion are elastically deformable toward said outer frame.

3. The spacer according to claim 1, wherein a notch portion is formed on a part of said outer frame opposite to said release portion, and end portions of said outer frame located on both ends of said notch portion can be distorted and superimposed on each other when opening said release portion for mounting said wires on said single mounting hole.

4. The spacer according to claim 1, wherein said single mounting hole includes a wire inlet on the side of said substantially V-shaped release portion, and the width of said inlet of said single mounting hole increases in response to the degree of opening of said release portion.

5. The spacer according to claim 1, wherein said mounting hole includes:
- a first mounting hole capable of mounting a wire having a first diameter, and
- a second mounting hole, provided adjacently to said first mounting hole, capable of mounting a wire having a second diameter larger than said first diameter.

6. The spacer according to claim 5, wherein a substantially V-shaped notch portion opening by absorbing stress applied to said spacer when hanging said hook on said hook receiver is provided on the opposite side of said substantially V-shaped release portion.

7. The spacer according to claim 5, wherein said first mounting hole includes a wire inlet on the side of said substantially V-shaped release portion, and the width of said inlet of said first mounting hole increases in response to the degree of opening of said release portion.

8. A mounting structure for a lead wire employing a spacer comprising:

an outer frame;

a plurality of ribs radially provided from said outer frame toward a central part;

a mounting portion, provided on said central part of said outer frame, capable of mounting lead wires having different diameters;

a release portion, provided to reach said mounting portion on said central part from said outer frame, having a substantially V shape;

a hook integrally provided on one of opposite end surfaces of said substantially V-shaped release portion; and a hook receiver integrally provided on another one of said opposite end surfaces of said substantially V-shaped release portion, wherein said lead wire is fixed by inserting said lead wire into said substantially V-shaped release portion for mounting said lead wire on said mounting portion and thereafter hanging said hook on said hook receiver, said mounting portion including a single mounting hole capable of mounting said lead wires having different diameters, and said single mounting hole having three grip portions for holding said lead wire, and at least one of said three grip portions being elastically deformable in response to the diameter of said lead wire.

9. The mounting structure for a lead wire employing a spacer according to claim 8, wherein said plurality of ribs include:
- first and second ribs forming said substantially V-shaped release portion,
- a third rib having a first branch portion branched into two parts on said central part with one end of said first branch portion connected to an end of said first rib, and
- a fourth rib having a second branch portion branched into two parts on said central part with one end of said second branch portion connected to an end of said second rib and another end of said second branch portion connected to another end of said first branch portion, said grip portions include:
- a first grip portion provided on the inner surface of a connecting portion between said third rib and said fourth rib,
- a second grip portion provided on the inner surface of a connecting portion between said third rib and said first rib, and
- a third grip portion provided on the inner surface of a connecting portion between said fourth rib and said second rib, and
- said first grip portion, said second grip portion and said third grip portion are elastically deformable toward said outer frame.

10. The mounting structure for a lead wire employing a spacer according to claim 8, wherein a notch portion is formed on a part of said outer frame opposite to said release portion, and end portions of said outer frame located on both ends of said notch portion can be distorted and superimposed on each other when opening said release portion for mounting said lead wire on said single mounting hole.

11. The mounting structure for a lead wire employing a spaced according to claim 8, wherein said single mounting hole includes a wire inlet on the side of said substantially V-shaped release portion, and the width of said inlet of said single mounting hole increases in response to the degree of opening of said release portion.

12. The mounting structure for a lead wire employing a spacer according to claim 8, wherein said mounting hole includes:

a first mounting hole capable of mounting a lead wire having a first diameter, and a second mounting hole, provided adjacently to said first mounting hole, capable of mounting a lead wire having a second diameter larger than said first diameter.

13. The mounting structure for a lead wire employing a spacer according to claim 12, wherein a substantially V-shaped notch portion opening by absorbing stress applied to said spacer when hanging said hook on said hook receiver is provided on the opposite side of said substantially V-shaped release portion.

14. The mounting structure for a lead wire employing a spacer according to claim 12, wherein said first mounting hole includes a wire inlet on the side of said substantially V-shaped release portion, and the width of said inlet of said first mounting hole increases in response to the degree of opening of said release portion.

* * * * *